United States Patent [19]
Groll

[11] Patent Number: 6,109,504
[45] Date of Patent: Aug. 29, 2000

[54] COPPER CORE COOKING GRIDDLE AND METHOD OF MAKING SAME

[75] Inventor: William A. Groll, McMurray, Pa.

[73] Assignee: Clad Metals LLC, Canonsburg, Pa.

[21] Appl. No.: 09/252,583

[22] Filed: Feb. 18, 1999

Related U.S. Application Data

[60] Provisional application No. 60/092,386, Jul. 10, 1998.

[51] Int. Cl.[7] .......................... B23K 20/04; B23K 20/08; B23K 20/227; A47J 37/06
[52] U.S. Cl. ...................... 228/107; 228/193; 228/235.3
[58] Field of Search ...................................... 428/660, 677, 428/685; 228/107, 193, 235.2, 235.3; 126/390; 220/573.1

[56] References Cited

U.S. PATENT DOCUMENTS

| | | | |
|---|---|---|---|
| 2,325,659 | 8/1943 | Chace | 29/181 |
| 2,473,686 | 6/1949 | Keene | 29/196.1 |
| 2,514,873 | 7/1950 | Keene et al. | 29/196.3 |
| 2,718,690 | 9/1955 | Ulam | 29/471.5 |
| 2,841,137 | 7/1958 | Chace | 126/390 |
| 3,050,834 | 8/1962 | Ulam | 29/196.3 |
| 3,298,803 | 1/1967 | Ulam | 29/196.3 |
| 3,490,126 | 1/1970 | Miller | 29/196.3 |
| 3,798,747 | 3/1974 | Lalwaney | 29/475 |
| 3,845,273 | 10/1974 | Hurko | 219/462 |
| 3,952,938 | 4/1976 | Ulam | 29/497.5 |
| 4,103,076 | 7/1978 | Ulam | 428/653 |
| 4,167,606 | 9/1979 | Ulam | 428/653 |
| 4,194,672 | 3/1980 | Uto et al. | 228/194 |
| 4,612,259 | 9/1986 | Ueda | 428/661 |
| 4,646,935 | 3/1987 | Ulam | 220/453 |
| 4,842,182 | 6/1989 | Szecket | 228/108 |
| 4,917,969 | 4/1990 | Pircher et al. | 428/685 |
| 5,190,831 | 3/1993 | Banker | 428/660 |
| 5,213,904 | 5/1993 | Banker | 428/651 |
| 5,227,597 | 7/1993 | Dickens et al. | 219/10.493 |

FOREIGN PATENT DOCUMENTS

| | | |
|---|---|---|
| 58-041688 | 3/1983 | Japan . |
| 06141979 | 5/1994 | Japan . |
| 06339435 | 12/1995 | Japan . |

*Primary Examiner*—John J. Zimmerman
*Attorney, Agent, or Firm*—Webb Ziesenheim Logsdon Orkin & Hanson, P.C.

[57] ABSTRACT

A composite griddle plate is provided having a heavy copper core which is diffusion bonded to one or more outer plates of stainless steel, carbon steel or titanium. The copper cored composite is made by explosion bonding the outer metal plates to the copper core to achieve diffusion bonding followed by multi-pass, small, incremental reduction passes in a hot rolling mill conducted within a narrowly controlled temperature range falling within the overlapping hot working range of the copper core and the dissimilar metal of the outer layers.

9 Claims, 1 Drawing Sheet

COPPER CORE COOKING GRIDDLE AND METHOD OF MAKING SAME

CROSS-REFERENCE TO RELATED APPLICATION

This application claims priority on U.S. Provisional Application Serial No. 60/092,386 filed Jul. 10, 1998.

BACKGROUND OF THE INVENTION

The present invention relates generally to clad metal composites used in cookware products and methods for bonding dissimilar metals. More particularly, the present invention relates to a multilayer bonded composite of dissimilar metals for use as the cook surface in griddles and grills of the type used in commercial establishments. Commercial fast food restaurants typically cook a high number of hamburger patties simultaneously on a griddle/grill cook surface. Conventional griddle cook surfaces are made of a heavy piece of carbon steel, on the order of one inch in thickness. This heavy gauge steel material provides a heat sink in an attempt to maintain a uniform high temperature along the griddle surface.

The attainment of a uniform high temperature is important in the commercial setting, to ensure that all food products, particularly hamburger patties, are cooked to a proper degree. Sickness and even death have occurred from *E. coli* food poisoning in hamburger meat which has been undercooked. According to recent statistics from the Centers for Disease Control, as many as 40,000 people a year may become ill from *E. coli* 0157:H7 bacteria. Undercooked or raw hamburger has been implicated in nearly all documented outbreaks.

In conventional, fast food cooking operations it is not uncommon for the restaurant to use frozen hamburger patties and to place the frozen patty directly on the griddle surface. Naturally, when a frozen patty contacts the griddle surface, heat is extracted therefrom and the griddle cools down in those areas. A similar cool-down occurs when the patties are periodically flipped during the cooking cycle. It is well-known that carbon steel is not one of the better heat conductors and, as such, there is a certain time lag after the surface cools down due to the placement of cold or frozen patties or the flipping operation to return to the proper minimum cooking temperature.

Thus, conventional carbon steel griddle surfaces experience significant time lags for thermal recovery which necessarily reflects on the total time required to thoroughly cook the food product.

In an effort to achieve greater product throughput, it is common commercial practice to flip hamburger patties to a hot spot on the griddle, i.e., a location which was previously unoccupied. In order to ensure food preparation safety, such a cooking technique requires proper training of personnel but does not eliminate the likelihood of accidental undercooking due to the occasional, inadvertent placement of the food product on a cold spot on a griddle.

Commercial carbon steel griddles require long preheat times prior to use due to the thermal conductivity shortcomings of steel alluded to above. This results in added energy costs. In addition, carbon steel griddle plates typically have a two- to three-inch wide region at the peripheral edge which is lower in temperature and therefore cannot be used for cooking due to lack of heat. Once again, total throughput is adversely affected by this limitation as well as the possible food safety issue due to undercooking if the food product is inadvertently placed near the edges.

Ideally, a commercial griddle plate should possess a hard cook surface such as steel to resist scratching and abrasion, but it should also possess high heat conductivity to reduce cold spot recovery time and preheat time.

Heretofore, there have been attempts to manufacture cooking griddles made from a composite metal plate having improved thermal conductivity properties so as to minimize the thermal recovery time lag caused by cold spots. One such product utilized a stainless steel clad aluminum plate. This attempt at a griddle plate has not been successful due to several inherent problems. Aluminum and stainless steel have significantly different coefficients of thermal expansion which causes a flat composite plate to experience thermal warpage upon heating. In addition, the bond between the stainless steel and the aluminum fails when the product is welded. This is caused by the formation of brittle intermetallic compounds of aluminum at the interface at elevated welding temperatures.

A further prior cooking griddle is depicted in U.S. Pat. No. 5,227,597 which discloses an induction heating surface employing a copper core with a nickel iron outer cladding. The copper core is relatively thin—0.100 inch—to provide localized heating and cooling. There is no disclosure as to how a bond is effected between the nickel iron and the copper core, although one common method to achieve such a bond involves brazing the dissimilar metal sheets. Such a bonding method does not produce a particularly suitable joint for a cooking surface since the thermal conductivity between the core and the outer surface layers is disrupted by the brazed joint which contains lower conductivity brazing fluxes, etc. Also, at cooking temperatures the brazed construction has been known to delaminate, which causes even more thermal conductivity problems due to the presence of insulating air spaces developed within the delaminated joints.

It has long been known that copper is difficult to roll bond to other metals because the copper oxide layer which forms on the surface upon exposure to the atmosphere is very ductile and prohibits contact with the underlying bare metal which is necessary to achieve diffusion bonding during roll bonding, for example.

An early method of joining a core of a 102 copper alloy to a copper nickel alloy, known as cupronickel, has also been employed to make composite stock for coinage. This method involved the so-called vacuum pack technique of roll bonding. A stack of starting plates comprising two outer plates of cupronickel with a core plate of 102 copper alloy had their peripheral edges welded to a border plate. The surfaces of the copper alloy plate were first abraded to remove the oxide layer. The edge welded stack was then evacuated by a vacuum pump and sealed to provide an oxygen-free environment for subsequent roll bonding. Thus, no oxide layer could form on the copper plate at rolling temperature due to the existence of a vacuum in the welded stack of plates. The copper alloy core and the cupronickel outer layers possess similar hot working temperatures to permit relatively easy rolling. The main problem in the above method, however, resides in the difficulty in achieving a sound vacuum pack which is imperative for proper roll bonding. Due to the inability to achieve uniformity, this method of bonding is very labor intensive and expensive.

An ideal cooking griddle would employ a core of copper or copper alloy with an intimately bonded outer layer of a corrosion-resistant material such as stainless steel. Other advantageous griddle plates would also employ the copper core but may employ a cooking surface of titanium or carbon steel.

To the best of my knowledge, it has heretofore not been possible to conventionally roll bond a composite plate of stainless steel with a copper core due to the difficulty in hot rolling these two materials. The hot working temperature of stainless steel approaches the melting point of copper, which makes the rolling process very difficult to commercially practice. The previously described vacuum pack method of initially forming a starting composite prior to rolling is also prohibitively costly, thus making a stainless steel clad copper core product commercially unattainable. The present invention provides a method for diffusion bonding copper to other dissimilar metals, such as stainless steel, carbon steel and titanium, and for subsequently rolling the bonded composite to provide an improved griddle plate in an economically feasible manner.

The present invention not only solves the problems confronted by commercial fast food establishments but has also overcome the limitations in the composite metals art by providing a clad metal composite griddle plate which offers several important advantages over the existing carbon steel griddle. The griddle plate of the present invention provides a cooking surface having far more rapid thermal recovery than that of the conventionally used carbon steel griddle plates which translates into greater food product throughout. In addition, the present invention provides a composite griddle plate material which practically eliminates cold spots on the cooking surface to greatly decrease the likelihood of accidental undercooking so as to markedly improve and safeguard health safety in the fast food industry.

Still further, the present invention provides a griddle which maintains a constant cooking temperature from edge to edge, thus eliminating the cold edge problems present in the prior art carbon steel griddle plates. In addition, the invention provides a composite griddle plate that can be bent, cut, formed or welded using the same methods employed for carbon steel and which does not form harmful, brittle intermetallics which prevent the welding of prior art heat conductive composites containing an aluminum core. Still further, the present invention provides a composite griddle plate which, upon heating, does not thermally warp or delaminate due to the similarities in the coefficients of thermal expansion of the materials employed in the composite.

In addition, the composite griddle of the present invention minimizes the initial heat-up time as well as the heat recovery time between cooking cycles to provide decreased energy costs and increased labor efficiencies.

SUMMARY OF THE INVENTION

Briefly stated, the present invention is directed to a multi-ply diffusion bonded metal plate, most preferably comprising exterior layers of stainless steel and a heavy core of copper or copper alloy therebetween. The finished griddle plate has a thickness ranging from 0.100 to 1.0 inch, with a preferred thickness ratio of about 10% stainless steel/80% copper/10% stainless steel in the layers of the composite griddle plate. A presently preferred griddle plate according to the invention has a finished thickness of 0.250 inch, wherein the copper core is about 0.20 inch thick and the outer stainless steel layers each have a thickness of about 0.025 inch. With respect to the specific metal alloys employed, the preferred griddle plate composition is a diffusion bonded composite of 304L grade stainless steel outer layers with an inner core of high purity C-102 grade copper.

The method of making the griddle plate according to the present invention includes the steps of providing outer sheets of stainless steel, preferably low carbon 304L grade stainless steel, each sheet being about 0.250 inch thick and an inner core sheet or plate of higher purity copper such as C-102 grade having a thickness of about 2 inches, for example, to form a three-ply composite stack; explosion bonding the stainless sheets to the copper plate inner core of the stack to form a composite slab; cutting the composite slab into smaller slabs; heating the smaller slabs to a temperature between 1400° F. and 1600° F.; hot rolling each of the smaller slabs by taking multiple passes at relatively low reductions, initially on the order of 0.100 inch per rolling pass while carefully maintaining the 1400° F.–1600° F. slab temperature by reheating the smaller slabs after each of the several rolling passes to produce a finished rolled composite plate; flattening the finished rolled composite plate in a roller leveler and air cooling. The mill scale is removed from the finished rolled, flattened and cooled plate by sand blasting. The smaller slabs cut from the composite slab are processed simultaneously according to the method of the present invention such that while one slab is undergoing a rolling pass, the remaining smaller slabs are undergoing reheating in a furnace to achieve the proper rolling temperature.

BRIEF DESCRIPTION OF THE DRAWINGS

These as well as other attributes of the invention will become more readily apparent when the following detailed description is read in conjunction with the appended drawings, in which.

DETAILED DESCRIPTION OF THE INVENTION

Figure 1:
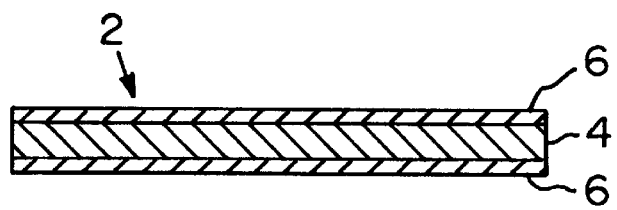
FIG. 1 is a cross-sectional view of a griddle plate according to the present invention.

The present invention is directed to a composite plate construction for use as a griddle plate in the food preparation industry. The composite griddle plate of the invention is generally designated 2 in FIG. 1. The griddle plate 2 comprises a relatively thick core 4 of copper and relatively thinner outer layers 6 of stainless steel intimately joined to the copper core 4 by diffusion bonding. The diffusion bonding between the copper core 4 and the stainless steel layers 6 is achieved by explosion bonding followed by hot rolling, the details of which will be explained below. The combination of stainless steel-copper-stainless steel allows the composite griddle plate 2 to display the superior energy transfer properties of copper coupled with the high corrosion and wear resistance of stainless steel.

A presently preferred stainless steel alloy for use in the outer layers 6 is Type 304L stainless. Conventional Type 304 stainless steel performs well during the bonding process, but the low carbon variety, Type 304L, is required to prevent grain boundary migration of chromium which leads to diminished corrosion resistance.

The presently preferred copper material for core layer 4 is a higher purity copper, such as type C-102 copper. A wide variety of copper alloys may be used, but for reasons of availability, thermal conductivity and economy, the higher purity C-102 copper is preferred. As used herein, the word "copper", unless otherwise qualified, includes high purity copper as well as alloys of copper.

Figure 2:
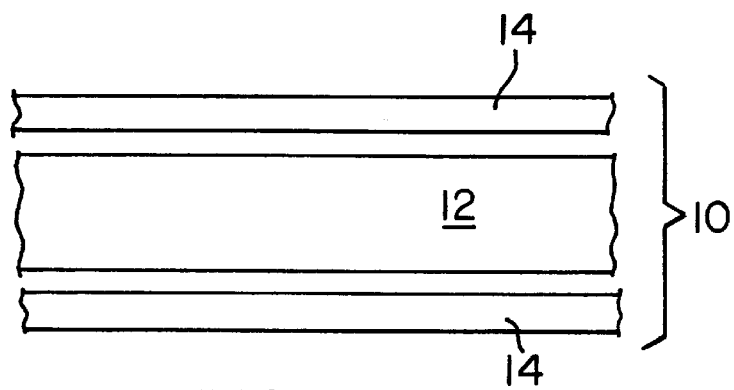
FIG. 2 is a fragmented, slightly expanded view of a three-ply stack of metal sheets used in the method of the present invention.
Figure 3:
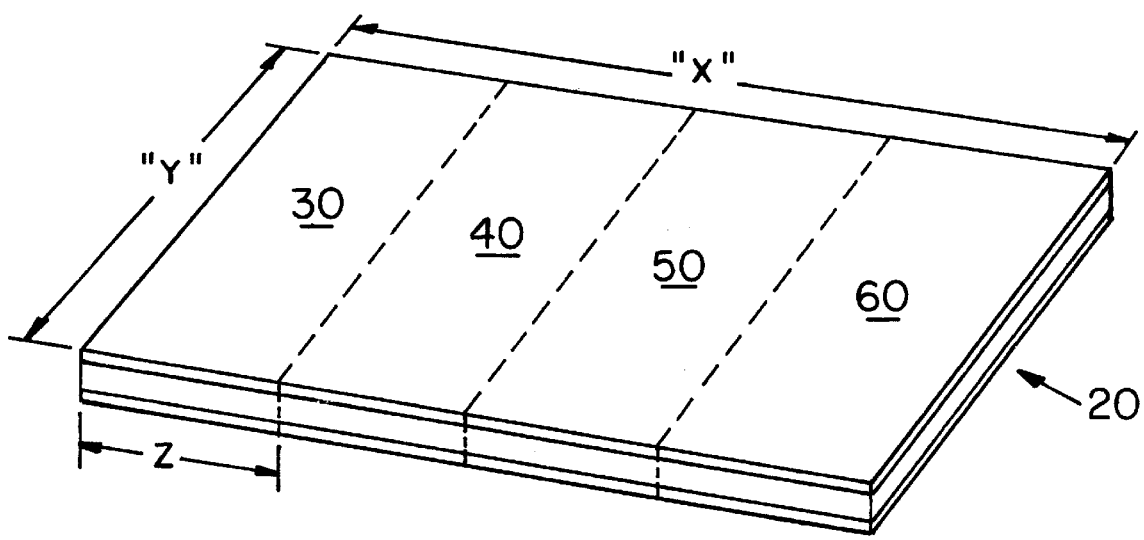
FIG. 3 is a perspective view of the explosion bonded slab made from the three-ply stack of FIG. 2.

In practicing the process of the present invention, a large three-ply stack 10 is first assembled, as depicted in FIGS. 2 and 3. The stack 10 comprises a central, core plate 12 of copper and two outer plates 14 of stainless steel. The starting thickness of the stainless steel plates 14 is chosen to accommodate the explosion bonding process, the welding required on the final product and to maximize the copper content of the composite griddle plate 2. By way of example, if a thickness ratio of 10%-80%-10% is used for the stack 10, at a total 90% rolling reduction, then a starting thickness of 0.100 inch for each of the stainless steel layers 14 would result in a final thickness of 0.010 inch for the layer 6 in the finished griddle plate 2. A stainless steel layer 6 thinner than 0.010 inch would not be practical for welding. It is necessary to be able to weld to the periphery of the finished griddle plate 2 to permit attachment of various items, such as a drip pan, for example. The stainless steel layers 6 provide an ideal welding site.

The finished griddle plate 2 can range in thickness from 0.1 to 1 inch, although a more preferred range is about 0.2 to 0.3 inch with a nominal presently preferred overall finished thickness of 0.25 inch. Thus, a presently preferred starting thickness range for the stainless steel for layers 14 in the stack 10 prior to bonding is 0.200 to 0.300 inch, which provides a final thickness range of 0.020 to 0.030 inch for each of stainless layer 6 of the finished composite griddle plate 2.

The practical maximum starting thickness for the stack of plates 10 depicted in FIG. 2 is 2½ inches, which limits the copper core plate 12 to a thickness of 2 inches. Thus, the total thickness of the stack 10 is 2½ inches prior to explosion bonding. A typical length/dimension "X" of the plates 12 and 14 forming the stack of plates is 120 inches long and the width "Y" is 48 inches, FIG. 3. These dimensions for the starting plates are chosen to maximize the economics of the explosion bonding process. It is advantageous to maximize the pounds of material being explosion bonded so as to lower the per pound bonding costs of the material.

Prior to explosion bonding, the surfaces of the copper core plate 12 and outer stainless steel plates 14 are cleaned by a chemical, high pressure wash or by a mechanical wire brush or abrasive means to remove the surface oxides and surface impurities. The cleaned plates 12 and 14 in the stack 10 are then explosively bonded by use of a known explosion bonding process which creates an initial diffusion bond between the copper core 12 and the stainless steel layers 14. The explosion bonding step forms a bonded composite slab 20 depicted in FIG. 3. A diffusion bond is obtained by joining the two clean metal surfaces by pressure such that the electrons of the iron and copper atoms are shared at the interface between the two dissimilar metal plates or sheets. Subsequent hot rolling improves the diffusion bond first established by explosion bonding.

After the composite slab 20 is formed by explosion bonding, the layers of stainless steel 14 are intimately bonded to the copper core plate 12 so as to prevent atmospheric oxygen from entering the composite. Thus, the copper core remains oxide free at its interface, even when heated to rolling temperature in a non-protective atmosphere.

As stated above, the stack 10 and resultant bonded composite slab 20 are made to the largest possible material dimensions to maximize the economics of scale. The subsequent roll bonding process, however, requires a very narrow temperature window which would be difficult, if not impossible, to achieve with a large slab of the size of slab 20 (10 feet×4 feet). Hence, the explosively bonded composite slab 20 is sawed, sheared or otherwise cut into smaller increments. The smaller slabs weigh, for example, between 500 pounds to 1,000 pounds each, which can be readily reheated as they are rolled. These smaller slabs are depicted schematically in FIG. 3 and are identified by reference numerals 30, 40, 50 and 60. Thus, four smaller slabs 30, 40, 50 and 60 are obtained from larger slab 20 wherein each of the smaller slabs has a dimensional width "Z" and a length "Y" which, by way of example, may be 2½ feet wide by 4 feet long by 2½ inches thick.

The smaller slabs 30, 40, 50 and 60 previously cut from the large explosion bonded composite slab 20 are then heated in a furnace to a rolling temperature of between 1400°–1600° F., requiring about 2–3 hours to accomplish. As stated above, because the slabs are explosion bonded, no atmospheric oxygen can enter between the bonded plates to reoxidize the copper. Hence, the heating of the smaller slabs is conducted in a non-protective furnace atmosphere.

It is critical to control the slab temperature between the narrowly prescribed 1400°–1600° F., range during the hot rolling process and, in addition, to carefully control the amount of reduction of the slab during each rolling pass through the mill. Temperature control is critical because it is necessary that the rolling pass occur while the stainless steel and the copper are within their respective hot working temperature ranges. Stainless steel has a hot working temperature range of between about 1400° F. to 2100° F. Copper, on the other hand, has a hot working temperature range on the order of about 1300–1600° F. Thus, with such a disparity in hot working ranges between these materials, the selected hot working temperature range covers the lower end of the stainless steel which overlaps the higher end of the copper hot working end.

Bearing in mind that copper has a melting point of 1920° F., the hot working range of 1400°–1600° F. is at a temperature where copper is more readily plastically deformed. Accordingly, large rolling reductions cannot be made with individual roll passes; otherwise, the copper would be plastically deformed to a high degree relative to the stainless steel layers and the copper would be squeezed out from between the stainless steel layers, much like toothpaste from a tube, to escape at the perimeter of the slab.

Thus, during the hot rolling process according to the present invention, it is imperative to limit the thickness reduction effected during each rolling pass to small increments of about 0.100 inch per pass. Rolling continues in this manner until the slabs 30, 40, 50 and 60 are reduced from 2½ inches to 2 inches, thus requiring about five passes at a 0.1 inch reduction per pass. Upon reaching a 2 inch thickness, the 2 inch thick slab may then be rolled at slightly more aggressive reductions of 0.150 inch per pass for about 6–7 passes until the slab has been reduced to a thickness of about 1 inch. The rolling reduction then becomes even more aggressive by effecting a 0.20 inch reduction per pass for 3 rolling passes to reach a final preferred griddle plate thickness of 0.25 inch.

It is imperative during each rolling pass that the slab remain within the prescribed hot working temperature range of 1400–1600° F. to allow for proper hot deformation of the copper and stainless steel materials. If the temperature is below 1400° F., the stainless steel cannot be hot worked, and if the temperature is above 1600° F., the copper becomes overly plastic. In order to ensure that this critical hot working temperature range is maintained, it is preferred to place the slabs 30, 40, 50 and 60 into a furnace after each rolling pass. It is thus advantageous to process a plurality of slabs such as slabs 30, 40, 50 and 60 simultaneously, such that when one of the slabs is being rolled, the remaining slabs are in the furnace being reheated or soaking within the prescribed hot working temperature. The next slab removed from the furnace for rolling would be a slab that has been soaking in the furnace the longest time, and the slab just rolled is placed back into the furnace. The process continues in this manner until all of the slabs 30–60 have been rolled to a desired finish plate thickness.

EXAMPLE

Cooking Test

A composite griddle plate 2, made according to the present invention, was tested under laboratory conditions pursuant to ASTM Standard Test Method No. F-1275-95 for griddle plates.

The griddle plate 2 tested was 20 inches wide×24 inches long×0.250 inches thick. The griddle plate 2 had a 0.20 inch thick core 4 of C-102 copper and outer layers 6 of 304L stainless steel diffusion bonded thereto, each layer 6 having a thickness of 0.025 inch. The griddle plate 2 was made by first explosion bonding outer layers of stainless steel to the copper core and by subsequent rolling in multiple heating and rolling steps as described above.

The objective of the cooking test was to demonstrate the performance of the composite griddle plate 2 relative to a heat-up time to 375° F., idle temperature plate distribution, and actual hamburger patty cooking performance. The heating unit was rated at 48,000 BTU/hr. input with IR burners. Electronic controls with thermocouple temperature sensing at the griddle surface were employed.

Results

The standard heat-up test was conducted and showed that it took less than five minutes to go from a cold start to a temperature of 375° F. measured on the surface of the griddle plate. This may be compared to a usual startup time of 15 to 30 minutes using a conventional carbon steel griddle plate. The idle temperature test showed good temperature distribution over the griddle plate, except for the region supported by a 0.75 inch wide steel frame plate used by the testing laboratory. The cooking test used 16 quarter-pound frozen meat patties having a 22% fat content. The cooking cycle measured a total of nine minutes with a time to flip of 5¾ minutes. The performance of the griddle and patty cooking was rated as good, with a patty center temperature greater than 160° F. measured. The frozen patties had an initial weight of 4.052 pounds and a final cooked weight of 2.357 pounds, indicating a weight loss of 42% due to fat and water loss during cooking. This is indicative of good patty cooking. Recovery time of the griddle, i.e., the time required to reach the desired cooking temperature of 375° F. after loading the griddle plate with frozen patties, was observed as being substantially instantaneous which is considered to be excellent. It was also noted that cooking could be conducted edge to edge over the griddle plate due to the excellent heat transfer properties provided by the heavy copper core 4. Thus, the cooking test demonstrated that the copper core/stainless steel composite griddle plate of the invention was far superior to the conventional carbon steel griddle plate.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A method for manufacturing composite copper core griddle plates, comprising the steps of:
   (a) providing a copper plate having a thickness of about 1–2 inches;
   (b) providing two metal plates comprising one or more metals selected from the group consisting of stainless steel and carbon steel, said metal plates each having a thickness of about 0.2–0.3 inches;
   (c) forming a three-ply stack comprising a core of said copper plate and upper and lower outer layers of said metal plates of stainless steel and/or carbon steel positioned adjacent to said copper plate;
   (d) explosion bonding the three-ply stack to form a three-ply composite plate;
   (e) cutting the explosion bonded, three-ply composite plate into a plurality of smaller three-ply composite slabs;
   (f) heating each of the smaller three-ply composite slabs to a rolling temperature of about 1400° F.–1600° F. (760° C.–870° C.) in a furnace;
   (g) sequentially rolling each of the heated composite slabs while each of said slabs is at the rolling temperature at a reduction of about 0.10–0.15 inch per rolling pass and returning each composite slab to the furnace for reheating to the rolling temperature after each rolling pass;
   (h) repeating the rolling and reheating steps of step (g) until a desired intermediate slab thickness is reached;
   (i) rolling the reheated slabs of intermediate thickness at a reduction of about 0.15–0.2 inch per rolling pass and returning the slabs to the furnace for reheating to the rolling temperature after each rolling pass; and
   (j) repeating the rolling and reheating steps of step (i) until a desired final griddle plate thickness of between about 0.1–1.0 inch is obtained for each of said smaller, three-ply composite slabs.

2. The method of claim 1 wherein the three-ply stack explosion bonded composite plate of step (d) is about 10 feet long by about 4 feet wide by about 2½ inches thick and wherein the cutting step (e) produces four smaller composite slabs, each measuring about 2½ feet wide by about 4 feet long by about 2½ inches thick.

3. The method of claim 2 wherein the copper plate is about 2 inches thick and the metal plates each have a thickness of about 0.25 inch prior to explosion bonding.

4. The method of claim 1 wherein the two metal plates are of stainless steel.

5. The method of claim 1 wherein one of the two metal plates is of stainless steel and a second of the metal plates is of carbon steel.

6. The method of claim 1 wherein the three-ply stack of step (c) comprises a core of type C-102 copper and the two metal plates comprise type 304L stainless steel.

7. The method of claim 6 wherein the copper core of the three-ply stack of step (c) has a thickness of about 2 inches and the type 304L stainless steel plates each have a thickness of about 0.25 inch.

8. The method of claim 7 wherein the final griddle plate thickness is about 0.25 inch, wherein the copper core has a final thickness of about 0.20 inch and wherein the stainless steel layers each have a thickness of about 0.02 to 0.03 inch.

9. The method of claim 1 wherein the cutting step (e) produces four smaller composite slabs comprising a first, second, third and fourth composite slab and wherein the first, second, third and fourth slabs are heated in step (f) to the rolling temperature and wherein the first composite slab is removed from the furnace and subjected to one rolling pass and returned to the furnace for reheating to the rolling temperature, whereupon the second composite slab is removed from the furnace and subjected to one rolling pass and returned to the furnace for reheating to the rolling temperature, whereafter the third composite slab is removed from the furnace and subjected to one rolling pass and returned to the furnace for reheating to the rolling temperature, whereafter the fourth composite slab is removed from the furnace and subjected to one rolling pass and returned to the furnace for reheating to the rolling temperature, whereafter the first composite slab is removed from the furnace and subjected to one rolling pass and returned to the furnace for reheating to the rolling temperature, so as to define a sequential reheating and single pass rolling schedule of the first, second, third and fourth composite slabs which continues in steps (g)–(l), whereby any composite slab being removed from the furnace for rolling at any given time has been reheated in the furnace a longer time than any of the other composite slabs then present in said furnace.

* * * * *